United States Patent
Kong

(10) Patent No.: US 9,958,115 B2
(45) Date of Patent: May 1, 2018

(54) LED TUBE GROW LIGHT

(71) Applicant: Qin Kong, San Diego, CA (US)

(72) Inventor: Qin Kong, San Diego, CA (US)

( * ) Notice: Subject to any disclaimer, the term of this patent is extended or adjusted under 35 U.S.C. 154(b) by 0 days. days.

(21) Appl. No.: 15/195,872

(22) Filed: Jun. 28, 2016

(65) Prior Publication Data
US 2017/0023187 A1   Jan. 26, 2017

Related U.S. Application Data

(60) Provisional application No. 62/195,783, filed on Jul. 22, 2015.

(51) Int. Cl.

| | | |
|---|---|---|
| *F21V 21/00* | (2006.01) |
| *F21K 9/275* | (2016.01) |
| *F21V 3/02* | (2006.01) |
| *F21V 29/83* | (2015.01) |
| *H05B 33/08* | (2006.01) |
| *A01G 7/04* | (2006.01) |
| *F21V 7/00* | (2006.01) |
| *F21V 3/04* | (2018.01) |
| *F21V 29/74* | (2015.01) |
| *F21Y 115/10* | (2016.01) |
| *F21Y 105/16* | (2016.01) |
| *F21Y 113/13* | (2016.01) |
| *F21K 9/68* | (2016.01) |
| *F21Y 107/70* | (2016.01) |

(52) U.S. Cl.
CPC ............. *F21K 9/275* (2016.08); *A01G 7/045* (2013.01); *F21V 3/02* (2013.01); *F21V 29/83* (2015.01); *H05B 33/0803* (2013.01); *H05B 33/0857* (2013.01); *F21K 9/68* (2016.08); *F21V 3/0418* (2013.01); *F21V 3/061* (2018.02); *F21V 7/00* (2013.01); *F21V 29/74* (2015.01); *F21Y 2105/16* (2016.08); *F21Y 2107/70* (2016.08); *F21Y 2113/13* (2016.08); *F21Y 2115/10* (2016.08); *Y02P 60/149* (2015.11)

(58) Field of Classification Search
CPC ... F21V 21/00; F21V 1/00; F21V 5/00; F21V 7/00; F21V 23/02; F21S 4/00
USPC .............. 362/217, 222, 223, 217.01–217.17
See application file for complete search history.

(56) References Cited

U.S. PATENT DOCUMENTS

| | | |
|---|---|---|
| 6,921,182 B2 | 7/2005 | Anderson |
| 7,033,060 B2 | 4/2006 | Dubuc |
| 8,297,782 B2 | 10/2012 | Bafetti |
| 8,333,487 B2 | 12/2012 | Mekhtarian |

(Continued)

*Primary Examiner* — Edwyn Labaze
(74) *Attorney, Agent, or Firm* — Clement Cheng

(57) ABSTRACT

A LED tube luminaire for growing plants in greenhouse and indoor horticulture comprising individual LEDs on a substrate with higher linear density, no focusing optics on LED, a glass tube, the end cups, electronics, and electrical contactors. The LED tube luminaire has high light intensity, random direction white light with different color temperature for grow and bloom. An LED grow light has a substrate mounted within a glass tube. A linear array of LED chips is mounted on the substrate and aligned in a single line and comprising a plurality of LED chips. The plurality of LED chips has a regular spacing of less than 15 mm on center. The linear array of LED chips has a single color temperature having greater than 80 color rendering index. A pair of terminals mounted on ends of the glass tube. The pair of terminals are not symmetrical.

19 Claims, 3 Drawing Sheets

LED tube luminaire side view

(56) References Cited

U.S. PATENT DOCUMENTS

| | | | | |
|---|---|---|---|---|
| 2004/0080938 A1* | 4/2004 | Holman | ................... | F21S 8/08 |
| | | | | 362/231 |
| 2005/0226636 A1* | 10/2005 | Hiramatsu | .......... | H01S 5/02228 |
| | | | | 398/182 |
| 2009/0288340 A1* | 11/2009 | Hess | ........................ | A01G 9/26 |
| | | | | 47/58.1 LS |
| 2012/0020071 A1* | 1/2012 | McKenzie | ............. | A01G 7/045 |
| | | | | 362/231 |
| 2012/0043907 A1* | 2/2012 | Lu | ......................... | A01G 7/045 |
| | | | | 315/287 |
| 2012/0169234 A1* | 7/2012 | Shew | ..................... | H02J 9/065 |
| | | | | 315/88 |
| 2013/0322081 A1* | 12/2013 | Pan | .................... | H01L 25/0753 |
| | | | | 362/249.02 |
| 2015/0084070 A1* | 3/2015 | Bierhuizen | ............... | F21K 9/90 |
| | | | | 257/88 |
| 2015/0378214 A1* | 12/2015 | Tran | ....................... | G02B 17/00 |
| | | | | 349/64 |
| 2016/0192598 A1* | 7/2016 | Haggarty | ............... | A01G 7/045 |
| | | | | 315/297 |
| 2016/0278304 A1* | 9/2016 | Elsegood | ................ | A01G 9/20 |
| 2016/0353671 A1* | 12/2016 | Shaughnessy | ......... | H05B 33/00 |

* cited by examiner

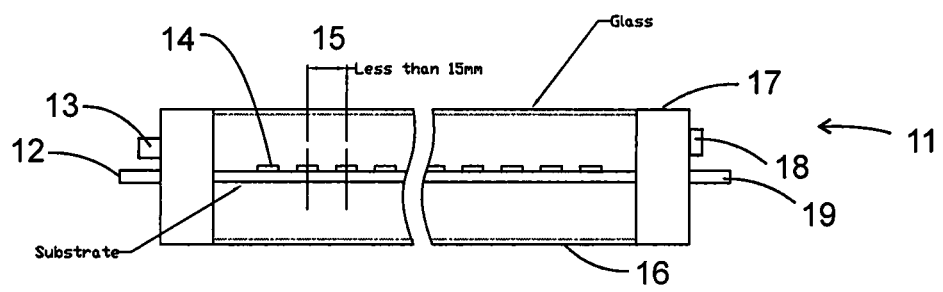
Fig. 1 LED tube luminaire side view
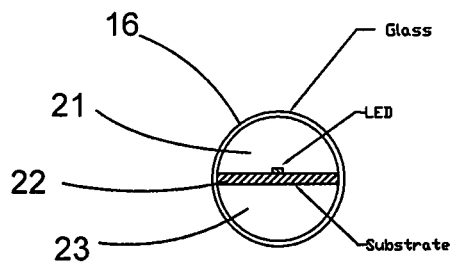
Fig 2 Cross section
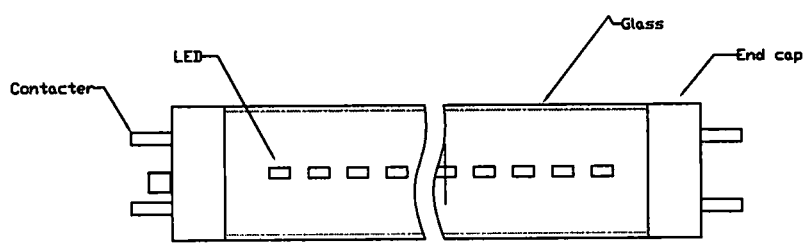
Fig. 3 LED tube luminaire top view

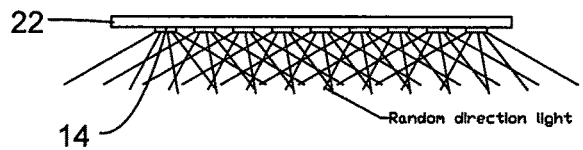
Fig 4 Random direction light
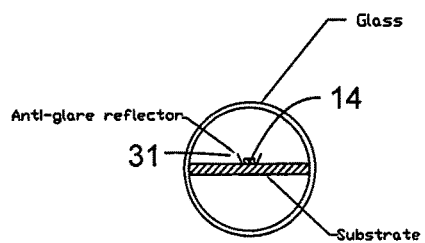
Fig 5 Cross section with anti-glare refelctor
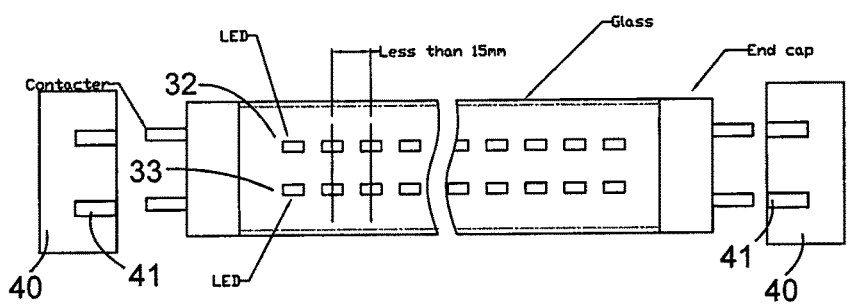
Fig. 6 Mult-line LED tube luminaire top view
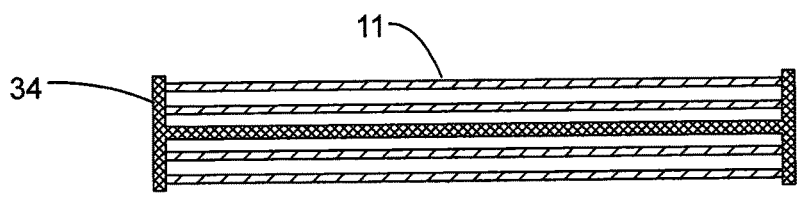
Fig 7 4 LED tube luminaire fixture

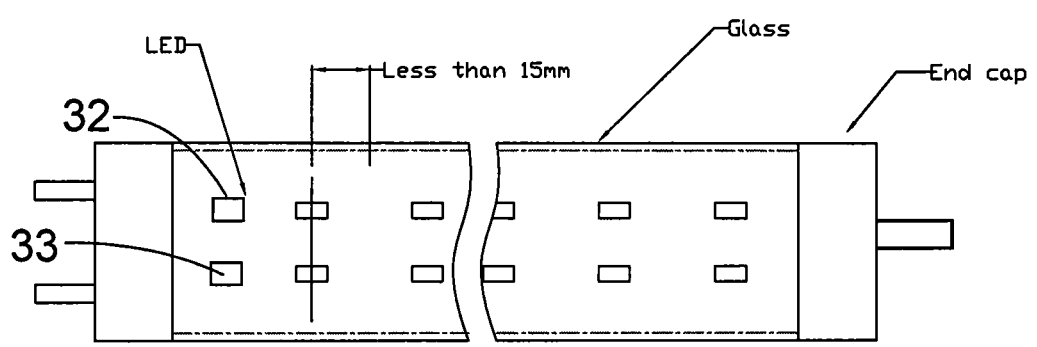
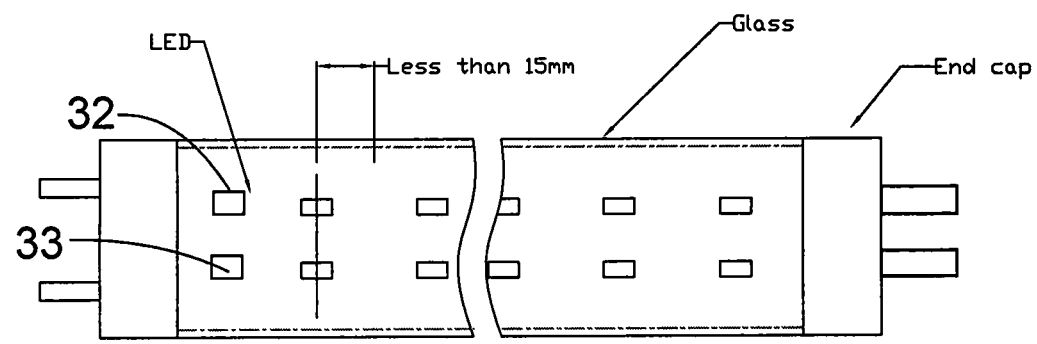
Fig. 8

LED TUBE GROW LIGHT

This application is a non-provisional of U.S. Provisional Patent Application Ser. No. 62/195,783 entitled LED Tube Luminaire for Plant Grow by inventor Qin Kong, filed Jul. 22, 2015, the disclosure of which is incorporated herein by reference.

FIELD OF INVENTION

The present invention related to LED light used for plant grow in the field of greenhouse and indoor horticulture application and more particularly the LED light has high light intensity, random direction white light with different color temperature for grow and bloom.

DISCUSSION OF RELATED ART

In nature, plant growth relies on natural sunlight. Natural sunlight has three main characteristics, namely: scattered direction; high intensity; and full spectrum. In greenhouse and indoor horticulture applications, growers use artificial lights. To avoid sun light shock and have plants that grow well, artificial light tries to mimic natural sunlight characteristics. Plant growers recently adopted LED (light emitting diode) lights in indoor horticulture and greenhouses. LED lights are a completely different light source compared to the traditional HID (high intensity discharge), HPS (high-pressure sodium), and fluorescent light sources. Unfortunately, LED lights have some performance drawbacks.

U.S. Pat. No. 6,921,182 entitled Efficient LED Lamp for Enhancing Commercial and Home Plant Growth by inventor William Grant Anderson, filed Mar. 13, 2003, disclosed the LED light with controlled light beam and light wave length. The narrow light beam LED is used in Anderson's device where the narrow light beam LED is a directional light source. Under the directional light source, the top leaves will receive the most light and block the light for the next layer of the leaves. Therefore the next layer of the leaves will receive less light and be smaller than the top leaves. The directional light affects the plant growth.

U.S. Pat. No. 7,033,060 entitled Method and Apparatus or Irradiation of Plants Using Light Emitting Diodes by inventor Eden Dubuc, filed Sep. 30, 2003, discloses a LED structure. The Dubuc LEDs are located too far apart and does not produce a scattered random direction light source when a plant grows close to the light. Also, the LED chips are exposed and cannot last long in a greenhouse in where the air contains chemicals.

U.S. Pat. No. 8,297,782 B2 entitled Lighting System for Growing Plants by inventor Vincent Bafetti, filed on Jul. 24, 2009, disclosed a LED light fixture with a dense array of LED chips in a small structure. Bafetti's structure became a directional light source. Unfortunately, Bafetti's structure has a complicated control system and is expensive to produce.

U.S. Pat. No. 8,333,487 entitled LED Grow Light by inventor George Mekhtarian, filed Dec. 24, 2010, disclosed a LED light system. Mekhtarian's LED light system integrated many LED chips into a small area coupled to a thermal management structure. Mekhtarian's light system is a directional light source.

Commonly used fluorescent light tubes have different size such as T12, T8, T6, and T5. Each fluorescent light tube has a pair terminals at each end. The spacing between two terminals at each end are the same. When people started to make LED tube, they used the same terminal configuration as fluorescent light tube. But if people use a fluorescent light tube to replace a LED light tube, it may cause hazard situation because the wiring for LED light tube may be different to fluorescent light tube.

SUMMARY OF THE INVENTION

An LED grow light has a substrate mounted within a transparent tube such as plastic or glass tube. A line of LED chips is mounted on the substrate and aligned in a single line and comprising a plurality of LED chips. The plurality of LED chips has a regular spacing of less than 15 mm or 10 mm on center. Each LED chip is less than 0.45 watts. The linear array of LED chips has a single color temperature having greater than 80 color rendering index. The terminals or terminal is mounted on ends of the transparent tube, and the two ends terminals are different each other.

Optionally, the LED grow light has a line of LED chips that includes at least 300 chips and is about 1 m long. The light angle produced from each LED chip is about 115°. The LED grow light optionally has a reflectors mounted with each side of the line of LED chips for increasing the useable light in some applications. A main air gap and a secondary air gap can be divided by the substrate. The LED chips output a light color temperature higher than 6000 Kelvin or output a light color temperature lower than 3500 Kelvin. A set of different bulbs with different output light color temperature can be switched depending upon plant growth phase.

The following are the objects of the invention: It is the primary objective of this present invention to provide an improved LED grow light in which the white light color temperature is higher than 6000 Kelvin. It is the second objective of this present invention to provide an improved LED bloom light in which the white light color temperature is lower than 3500 Kelvin. It is the third objective of this present invention to provide an improved LED tube luminaire with a random direction of light. It is the fourth objective of this present invention to provide an improved high light intensity LED tube luminaire in which the spacing between the individual LED is less than 15 mm. It is the fifth objective of this present invention to provide an improved LED tube luminaire in which the LEDs, substrate, electronics are located in a glass tube. It is the sixth objective of this present invention to provide an improved LED tube luminaire in which a reflector can be installed to increase the useable light. It is the seventh objective of this present invention to provide an improved LED tube luminaire in which the electrical connect at each end of tube are different.

BRIEF DESCRIPTION OF THE DRAWINGS

FIG. 1 is an example of the simplified side view of the LED tube luminaire.

FIG. 2 is an example of the simplified cross view of the LED tube luminaire.

FIG. 3 is an example of the simplified top view of the LED tube luminaire.

FIG. 4 is an example of the simplified view the high intensity random direction of the LED light.

FIG. 5 is an example of the simplified cross view of the LED tube luminaire with an antiglare reflector.

FIG. 6 is an example of the simplified top view of the LED tube luminaire with more line of the LED for more light output.

FIG. 7 is an example of the simplified top view of the LED tube luminaire in a fixture.

FIG. 8 is an example of two different asymmetric terminal configurations at each end of the LED tube luminaire.

The following call out list of elements can be a useful guide in referencing the element numbers of the drawings.

11 LED Tube
12 first side contact
13 first side protrusion
14 LED chip
15 LED chip on center spacing
16 glass tube
17 end cap
18 second side protrusion
19 second side contact
21 main air gap
22 substrate
23 secondary air gap
31 antiglare reflector
32 first LED chip row
33 second LED chip row
34 LED fixture frame
40 socket of LED fixture frame
41 socket indent

DETAILED DESCRIPTION OF THE PREFERRED EMBODIMENT

As seen in FIGS. 1, 2, and 3, the LED tube luminaire 11 has individual LED chips 14 mounted on a substrate 22. The substrate is mounted within a glass tube 16 having end caps 17. The end caps 17 have electrical contacts including a first side contact 12 and a second side contact 19. The electrical contacts are terminals. Optionally, a first side protrusion 13 and a second side protrusion 18 can provide an asymmetrical polarized electrical connection to prevent interchanging the LED tube luminaire 11 with a fluorescent bulb. The LED tube luminaire 11 is preferably mounted to an LED fixture frame 34. The socket of LED fixture frame 40 has indentations for receiving the endcap 17 as well as the terminals. The indentations 41 match the terminals. The terminals are preferably asymmetric with one end of the terminals being different than the other.

Each LED chip is less than 0.45 W. When the LED chips are 10 mm on center apart from each other, the LED chips are preferably less than 0.45 W each.

The light angle produced from each LED chip 14 is about 115°. As seen in FIGS. 1, 2, and 3, the individual LED chip 14 can lack a focusing lens. The LED tube luminaire has scattered random direction light output. Without a focusing lens, an LED may lose some light intensity to the plant. To compensate the intensity lost, more LED chips 14 can be used. According to FIGS. 1, 2, and 3, the spacing 15 between the LED chips 14 should less than 15 mm. The linear LED density is much higher than a regular linear LED array such that a large number of small LED chips are mounted to the substrate to increase light intensity. Applicant testing shows that plant growth under this LED tube luminaire 11 does not have any sun light shock.

The glass tube 16 forms a main air gap 21 and a secondary air gap 23 with a substrate 22 between the main air gap 21 and the secondary air gap 23. The glass tube 16 is a heatsink and heat fin that is easy to clean due to its continuous surface. In greenhouse and indoor horticulture applications, various chemicals are used for plant growing. The LED tube luminaire is made as a single tube service that can be cleaned without damaging the outside surface of the tube. In the present invention, a glass tube is used instead of a plastic enclosure such as a polycarbonate tube. Preferably, this LED tube luminaire can be configured to resist a variety of different chemicals and can be cleaned without scratching the tube surface.

Referring to FIG. 4, a high intensity scattered random direction light is generated from the line light of the high density closely packed line of LED chips. The individual LED does not have the focusing lens to concentrate the light. Using the small spacing between the individual LED which has wide angle light, the high intensity scattered random direction light is achieved.

Sunlight generally has full light spectrum. Artificial light has difficulty matching the spectrum of sun light. In the present invention uses a 2 LED tube luminaire. One LED tube luminaire is for plant growing period. After the plant growing time is over, the LED tube can be changed. The second LED tube luminaire light is for the plant bloom period. The color temperature of the LED grow light is higher than 6000 Kelvin. The color temperature of the LED bloom light is lower than 3500 Kelvin. With these 2 types of LED tube luminaries, plant growth can provide a result similar to full spectrum sun light. The applicant engaged in laboratory tests and a variety of different plants grown under these 2 different types LED light does not suffer any sun light shock at all.

Referring to FIG. 6, more rows of LED chips can be added to this LED tube luminaire to generate more light output. For example, a first LED chip row 32 can be supplemented by a second LED chip row 33. The plurality of LED chips should have a regular spacing of less than 15 mm on center meaning that the distance between the center of each LED chip should be less than 15 mm. The best mode is to have the LED chip on center spacing less than 10 mm. As the number of LED chips is increased, the power is proportionally decreased and each LED chip should be physically smaller so that total energy consumption remains constant while the number of LED chips increases. A large number of very small LED chips can be mounted as close as 1 mm apart from each other or less. The figures show one of the main ideas of the present invention which is to decrease the chip spacing while increasing the number of chips so that discrete points of light becomes a continuous line of lights.

When using 2 or more rows LED, each row of LED can have different color temperature. By adjusting current for each row of LEDs, a multiple color temperature LED tube can be achieved. Rows of LED's preferably appear as lines of light without discernible gaps between.

Referring to FIG. 5, a small reflector 31 can be added to the LED tube luminaire for increasing usable light in some applications. The small reflector is optional.

Referring to FIG. 7, a LED fixture frame 34 receives LED tube luminaires. The LED fixture frame 34 does not require any reflectors outside of the LED tube luminaire. The LED fixture frame 34 preferably blocks less sun light compared to a fluorescent light fixture and HID light fixture during day time. Referring to FIG. 2, a flexible substrate can be used as well. Since the substrate is flexible, the LED can be glued to the glass tube so that the glass tube becomes a tube shaped heat sink. Also, the glue used should have good thermal conductivity properties.

The substrate 22 preferably bisects or divides a main air gap 21 and a secondary air gap 23, which both have a curved hemi cylindrical shape. The main air gap 21 has a complementary shape similar to the secondary air gap 23. The main air gap 21 is heated by the line of LED chips and the secondary air gap 23 is also heated by the line of LED chips. Both air gaps transfer heat to the glass tube which in turn transfers heat to the external atmosphere.

Plant growth requires light, which is commonly measured as light energy in units of umol/s. Typically plant growth is not measured in lumens which is more appropriate for measuring the effect of light on the human eye. Of course, higher CRI color rendering index will have more umol/s of energy.

The LED grow light optionally has multiple line of LEDs with each line of LED having a different color temperature; and the color temperature of the LED grow light is configured to be adjustable.

FIG. 8 is an example of two different asymmetric terminal configurations at each end of the LED tube luminaire, with the first asymmetric terminal configuration being one terminal on one end and two terminals on the other end. Asymmetry can be provided by having a different number of terminals on each end of the tube. Asymmetry can also be provided by having a different width between the terminals. The second asymmetric terminal configuration is a terminal configuration that has varying width of spacing between terminals and also different size of terminals. Terminals can be asymmetrical and different from each other at each end by differing in number. The terminals can be asymmetrical and different from each other at each end by differing in spacing or size.

The typical tube is approximately a meter long and has at least 300 chips arranged to appear as a single line. A half length or size tube can be used that is a half meter long and has at least 150 chips arranged to appear as a single line.

The invention claimed is:

1. An LED grow light comprising:
   a. a substrate mounted within a transparent tube;
   b. a line of LED chips mounted on the substrate and aligned in a single line and comprising a plurality of LED chips, wherein the plurality of LED chips has a regular spacing of less than 10 mm on center, wherein each LED chip is less than 0.45 watts;
   c. wherein the linear array of LED chips has a single color temperature having greater than 80 color rendering index, wherein a high intensity scattered random direction light is generated from the line of LED chips, wherein each individual LED chip lacks a focusing lens to concentrate light;
   d. a pair of sockets; and
   e. a pair of terminals mounted on ends of the transparent tube, wherein the pair of terminals, wherein the pair of sockets receives the pair of terminals, wherein each LED chip in the line of LED chips has the same light color temperature.

2. The LED grow light of claim 1, wherein transparent tube is glass.

3. The LED grow light of claim 1, wherein the light angle produced from each LED chip is about 115°.

4. The LED grow light of claim 1, further comprising a reflector mounted with each of the LED chips for increasing the useable light.

5. The LED grow light of claim 1, further comprising a main air gap and a secondary air gap divided by the substrate.

6. The LED grow light of claim 1, wherein the LED chips output a light color temperature higher than 6000 Kelvin.

7. The LED grow light of claim 1, wherein the LED chips output a light color temperature lower than 3500 Kelvin.

8. The LED grow light of claim 1, wherein the light angle produced from each LED chip is about 115°, further comprising an reflector mounted with the line of LED chips for increasing the useable light, and further comprising a main air gap and a secondary air gap divided by the substrate.

9. An LED grow light comprising:
   a. a substrate mounted within a transparent tube;
   b. a line of LED chips mounted on the substrate and aligned in a single line and comprising a plurality of LED chips, wherein the line of LED chips has a regular spacing of less than 15 mm on center, wherein each LED chip is less than 0.45 watts, wherein the line of LED chips is at least a half meter long and has at least 150 chips;
   c. wherein the linear array of LED chips has a single color temperature having greater than 80 color rendering index, wherein a high intensity scattered random direction light is generated from the line of LED chips, wherein each individual LED chip lacks a focusing lens to concentrate light; and
   d. terminals mounted on ends of the transparent tube, wherein the terminals are asymmetrical and different from each other at each end and also have polarity, wherein each LED chip in the line of LED chips has the same light color temperature.

10. The LED grow light of claim 9, wherein transparent tube can be glass, wherein the light angle produced from each LED chip is about 115°.

11. The LED grow light of claim 9, further comprising a reflector mounted with each of the LED chips for increasing the useable light.

12. The LED grow light of claim 9, further comprising a main air gap and a secondary air gap divided by the substrate.

13. The LED grow light of claim 9, wherein the LED chips output a light color temperature higher than 6000 Kelvin.

14. The LED grow light of claim 9, wherein the LED chips output a light color temperature lower than 3500 Kelvin.

15. The LED grow light of claim 9, wherein the light angle produced from each LED chip is about 115°, further comprising an reflector mounted with the line of LED chips for increasing the useable light, and further comprising a main air gap and a secondary air gap divided by the substrate.

16. The LED grow light of claim 9, wherein the terminals are asymmetrical and different from each other at each end by differing in number.

17. The LED grow light of claim 9, wherein the terminals are asymmetrical and different from each other at each end by differing in spacing.

18. The LED grow light of claim 9, wherein the line of LED chips has a regular spacing of less than 10 mm on center.

19. The LED grow light of claim 9, further comprising:
   a. multiple line of LEDs;
   b. each line of LED is different color temperature; and
   c. the color temperature of the LED grow light is configured to be adjustable.

* * * * *